(12) United States Patent
Pighin et al.

(10) Patent No.: US 8,786,610 B1
(45) Date of Patent: Jul. 22, 2014

(54) ANIMATION COMPRESSION

(75) Inventors: Frederic P. Pighin, Sausalito, CA (US); Jerome Scholler, San Francisco, CA (US)

(73) Assignee: Lucasfilm Entertainment Company Ltd., San Francisco, CA (US)

( * ) Notice: Subject to any disclaimer, the term of this patent is extended or adjusted under 35 U.S.C. 154(b) by 486 days.

(21) Appl. No.: 12/793,273

(22) Filed: Jun. 3, 2010

Related U.S. Application Data

(60) Provisional application No. 61/288,530, filed on Dec. 21, 2009.

(51) Int. Cl.
*G06T 13/00* (2011.01)
*G06T 11/00* (2006.01)

(52) U.S. Cl.
USPC .............................. 345/473; 345/467; 345/468

(58) Field of Classification Search
USPC ......................................................... 345/473
See application file for complete search history.

(56) References Cited

U.S. PATENT DOCUMENTS

| | | | |
|---|---|---|---|
| 5,818,463 A * | 10/1998 | Tao et al. ....................... | 345/473 |
| 6,606,095 B1 * | 8/2003 | Lengyel et al. ............... | 345/473 |
| 7,062,073 B1 * | 6/2006 | Tumey et al. ................. | 382/118 |
| 7,466,866 B2 * | 12/2008 | Steinberg ...................... | 382/243 |
| 7,508,990 B2 | 3/2009 | Pace | |
| 2005/0100319 A1 | 5/2005 | Saed | |

OTHER PUBLICATIONS

Lewis, J.P., "Fast Template Matching," Vision Interface 95, Canadian Image Processing and Pattern Recognition Society, Quebec City, Canada, May 15-19, 1995, pp. 120-123.

\* cited by examiner

*Primary Examiner* — Kee M Tung
*Assistant Examiner* — Leon T Cain, II
(74) *Attorney, Agent, or Firm* — Kilpatrick Townsend & Stockton LLP

(57) ABSTRACT

A system includes a computing device that includes a memory configured to store instructions. The computing device also includes a processor configured to execute the instructions to perform a method that includes identifying a portion of a representation of a character in an animation. The identified portion is associated with a feature of the character to be represented in a reconstructed version of the animation. The method also includes compressing the identified portion of the character representation and other portions of the character representation to produce a model of the character that is capable of reconstructing the animation.

36 Claims, 6 Drawing Sheets

ANIMATION COMPRESSION

CLAIM OF PRIORITY

This application claims priority under 35 USC §119(e) to U.S. Patent Application Ser. No. 61/288,530, filed on Dec. 21, 2009, the entire contents of which are hereby incorporated by reference.

TECHNICAL FIELD

This document relates to preparing animation information, such as data representing animated characters, for compression.

BACKGROUND

Various techniques may be implemented to produce animations such as animated characters. For example, blend shape animation or other similar techniques may be used for producing animated character features such as facial expressions for movie and television production. Through such techniques, complex animations for a range of emotions may be produced from extensive libraries and may include several hundred to thousands of blend shapes. As such, a considerable amount of computational power and memory resources may be needed to produce animations for such projects.

SUMMARY

The described systems and techniques for preparing models, which include a finite number of shapes, from a series of animations. Along with reducing memory needs for storing the finite shapes, the models may be efficiently transferred to one or more computing devices (e.g., a game console) for reconstructing the animations.

In one aspect, a computer-implemented method includes identifying a portion of a representation of a character in an animation. The identified portion is associated with a feature of the character to be represented in a reconstructed version of the animation. The method also includes compressing the identified portion of the character representation and other portions of the character representation to produce a model of the character that is capable of reconstructing the animation.

Implementations may include any or all of the following features. Identifying the portion of the character representation may include assigning a weight to the portion. Assigning the weight to the portion of the character may be based upon a rule, user input, etc. The identified portion of the character may include a vertex, a surface region of the character, and the like. Assigning the weight to the portion of the character may be based upon a facial expression of the character in the animation. The compressing may account for position changes of the identified portion across a series of frames included in the animation. The compressing may also account for the movement, velocity, etc. of a vertex represented in a series of frames included in the animation. The character feature may be included in a facial expression of the character. Compressing may include principal component analysis or other similar types of analysis. The model may include sixteen shapes or other number of shapes. The character may be an online character included in a video game.

In another aspect, a computer program product tangibly embodied in an information carrier and comprising instructions that when executed by a processor perform a method that includes identifying a portion of a representation of a character in an animation. The identified portion is associated with a feature of the character to be represented in a reconstructed version of the animation. The method also includes compressing the identified portion of the character representation and other portions of the character representation to produce a model of the character that is capable of reconstructing the animation.

In another aspect, a system includes a computing device that includes a memory configured to store instructions. The computing device also includes a processor configured to execute the instructions to perform a method that includes identifying a portion of a representation of a character in an animation. The identified portion is associated with a feature of the character to be represented in a reconstructed version of the animation. The method also includes compressing the identified portion of the character representation and other portions of the character representation to produce a model of the character that is capable of reconstructing the animation.

Details of one or more implementations are set forth in the accompanying drawings and description below. Other features, aspects and advantages will be apparent from the description and drawings, and from the claims.

DESCRIPTION OF DRAWINGS

Like reference symbols in the various drawings indicate like elements.

DETAILED DESCRIPTION

Figure 1:
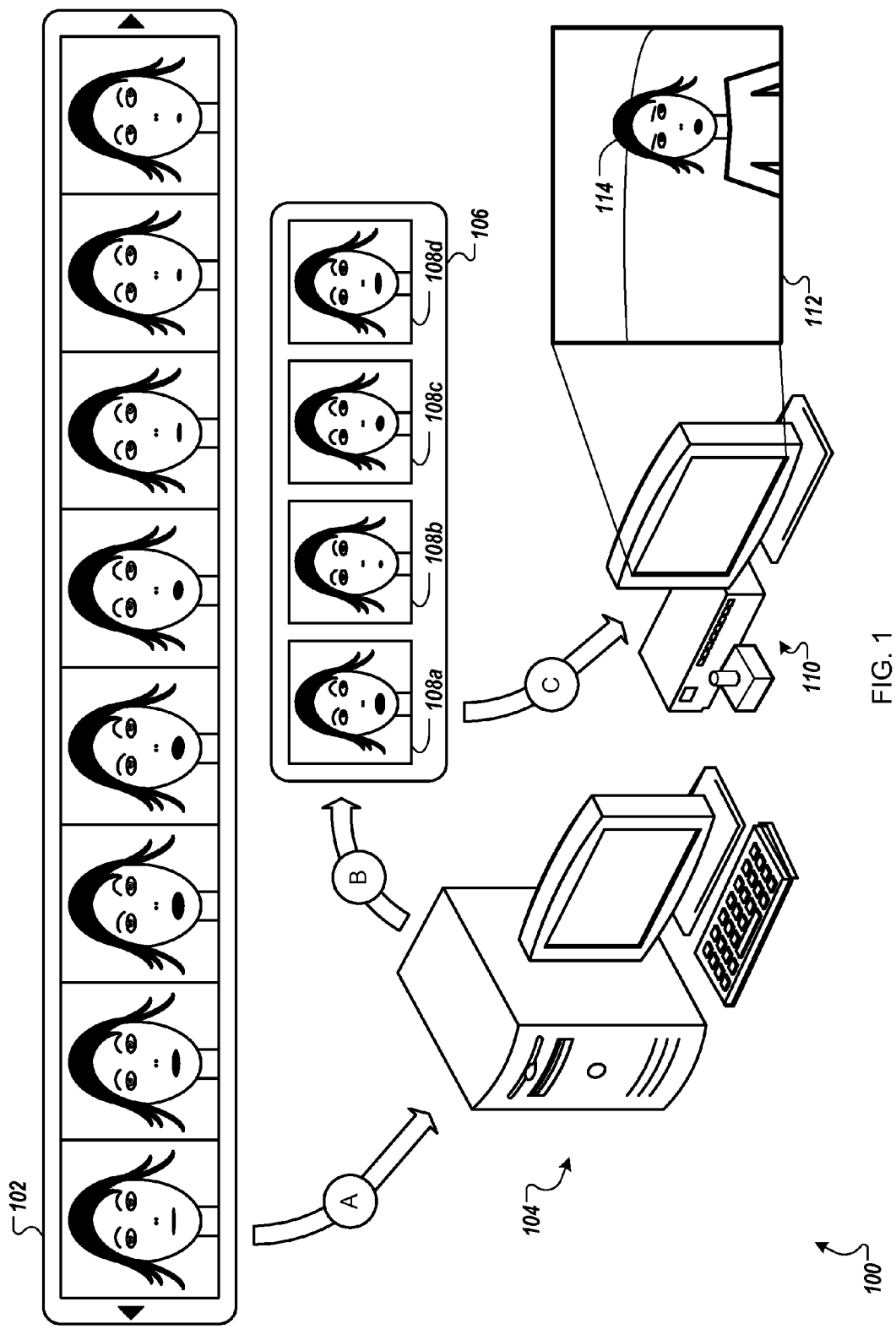
FIG. 1 illustrates an animation system.

FIG. 1 illustrates an exemplary animation system 100 for producing animations with various levels of quality, for example, depending upon the viewing environment. For example, the animation system 100 may be used for providing animations for online applications such as video game titles, interactive virtual environments, etc. In general, to render animations, online application environments may be considered as having lesser capabilities compared to offline environments (e.g., animation systems for movie production, etc.). For example, computational resources (e.g., processing power, memory size, etc.) may be limited for online system components (e.g., game consoles) due to physical and operational constraints. Further, since character movements are not typically known prior to game play (e.g., characters are directed by user interaction), animation sequences may not be created far in advance prior to being rendered (compared to producing animations for movies). To produce animations in an efficient online manner, the animation system 100 uses one or more processing techniques (e.g., compression) to allow efficient transferring of the animations and near real-time modification to the animations (e.g., based upon conditions of a video game or virtual environment).

For illustration, the animation system 100 processes an animation 102 that includes a series of frames that correspond to a sequence of time. The animation 102 can be produced by using one or more techniques and methodologies such as skinning, simulation, motion capture, or blend shapes, to name a few examples. Various types of content may be included in the animation 102, for example, one or more characters (e.g., moving or stationary) or other types of objects (e.g., clothings) may be represented in the animation. In the present example, the animation 102 represents facial expressions of a character for a video game. Over a series of frames, the animation 102 illustrates the character changing its facial expressions (e.g., facial movements in relation to speech).

The animation system 100, in this example, includes components such as a computer system 104 that can include one or more processing devices, input devices, output devices, and storage devices. Here, as shown by arrow A, the computer system 104 may receive the animation 102, for example, which may be provided in one or more forms such as a computer file, a set of computer commands, motion capture video, motion capture data, etc. In one example, the animation 102 may be an animation file transferred to the computer system 104, or, the animation 102 may be produced by the computer system 104.

To prepare the animation 102 for an online application, the computer system 104 can use one or more techniques to process the animation for transfer. For example, the animation may be compressed using one or more methods that include techniques such as Principal Component Analysis (PCA) and other techniques that can be implemented individually or in combination with PCA. As represented by arrow B, a compressed animation model 106 can be produced by the computer system 104 based on the animation 102. In this illustration, the compressed animation model 106 includes a set of shapes 108a-d that represent information associated with one or more objects (e.g., a character) or object features (e.g., a character's face, clothing, etc.). Such information may represent movement, positional, textural, color, lighting information, etc. For example, the shapes 108a-d may be shapes (e.g., that may be provided by PCA or other compression techniques) that may be transferred and used for reconstructing portions of the animation 102. In this example, the four shapes 108a-d are produced for providing an approximation of the animation 102, however, more or fewer shapes may be produced in other implementations. In general, producing additional shapes provides a more accurate approximation of the animation 102.

The animation system 100 also includes a display system 110 that includes a display screen 112 for viewing animations provided by the compressed animation model 106. The display system 110 can be a video game console or other type of computing device that may or may not be capable of network communication like accessing a network such as the Internet. Various types of display technology may be utilized by the display screen 112, for example flat screen technology, video projection technology, or virtual reality device technology, to name a few examples. One or more techniques may be used for transferring the compressed animation model 106 to the display system 110. For example, the compressed model 106 can be bundled with video game content contained on a physical medium such as a disc (e.g., a compact disc). Alternatively, rather than using a physical medium, the compressed animation model 106 can be transferred to the display system 110 using a network connection such as an Internet connection, or other type of networking technology.

In this illustrative example, the content of the compressed animation model 106 represents facial expressions of a real-time video game character. By using the compressed animation model 106, an approximation of the character facial expressions represented in the animation 102 can be rendered and presented on the display screen 112. Dependent upon the input provided to the compression scheme, some information may be lost or not properly represented in the reduced set of shapes produced by the compression scheme. For example, particular character features may not be properly represented in animations reconstructed from the compressed animation model 106. Based upon sufficient input, facial features associated with small levels of movement may not be properly represented. For example, due to a lack of input (provided to the compression technique), a character's eyebrows may be improperly reconstructed in an animation (as shown in an exemplary reconstructed animation 114 displayed in a screen 112). Facial features such as eyebrows may represent a small portion of the overall movement of a character's face expression. However, these small, subtle feature movements may significantly contribute to conveying the emotion represented by the reconstructed animation. As represented in the screen 114, the inaccuracy of the eyebrow positions can clearly affect the expression being conveyed by the displayed character's face.

Along with inaccurately representing one or more character features based on input provided to the compression technique, other undesirable artifacts may appear in animations reconstructed from reduced shape models. For example, the movements of separate character features (e.g., facial features) may appear noticeably associated when presented to an end viewer. Movements of a character's jaw may appear to be associated (e.g., slightly correlated) with movements of the character's eyebrows. As such, an end viewer may be distracted by eyebrow movements that may appear to flicker in an unrealistic manner. Further, reconstructed animations may appear to transition from one expression to another in nonrealistic manners. In some arrangements, input animations for the compression scheme are selected that represent extreme facial expressions of a character (e.g., expression of extreme happiness, despair, shock, etc.). While such selected input animations may provide for a significant range of expressions for reconstruction, transitions from one expression to another may not appear to smoothly occur in a natural manner. As such, the reduced shape model may lack information associated with transitioning from one expression to another.

One or more techniques or methodologies may be implemented to assure that particular animation features are included in reduced shape models prior to being transferred. For example, one or more techniques may be used for identifying animation features for inclusion into models. Such identifying may be provided from user interaction, in an automated fashion, or a combination of such techniques. Further, additional information associated with transitioning from one facial expression to another may be used for reduced shape model production. Such additional input information may improve the accuracy of reconstructed animations (from a viewer's perspective), and, adjusting the compression technique may provide smoother transitions among expressions.

Figure 2:
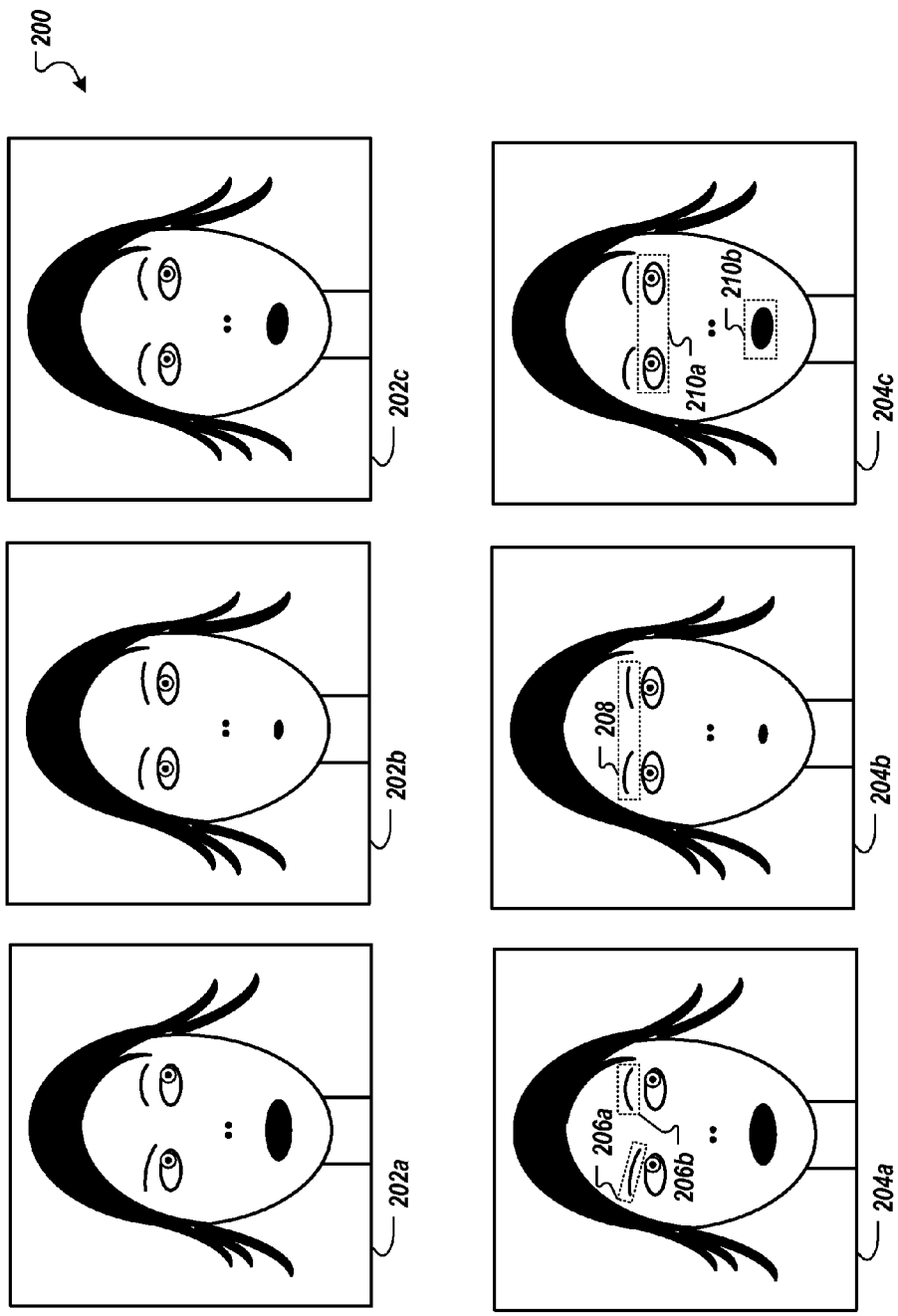
FIG. 2 illustrates identifying portions of animations to produce animation models.

Referring to FIG. 2, a portion of an animation is presented to illustrate identifying animation portions (e.g., character features) for use in producing a reduced shape model. In this example, a series of frames 200 from animation 102 are shown that each present character facial expressions. Viewing the frames (e.g., frames 202a, 202b and 202c) left to right, particular features of the character transition through a series of noticeable movements while the other facial features of the character provide subtle, less-noticeable movements. For example, the character's mouth transitions from open, to nearly closed, to open again in the frames 202a, 202b and 202c. During this three-frame sequence, the character's eyebrows make comparatively smaller movements, however, the movements assist in conveying the emotion of each facial expression. As such, improper reconstruction of the eyebrow movements may be noticeable to an end viewer.

One or more techniques may be implemented for including character features, both with noticeable and subtle movements alike, into a compressed animation model. For example, levels of importance may be assigned to features represented in the character's face to prioritize the features for inclusion in a model. In one arrangement, numerical values may be assigned to facial features to indicate the level of importance in regards to the features being represented in a model of the character. As such, heavily weighted features may be considered as being essential for inclusion in a model while features assigned lesser weights may be considered less important or even optional for inclusion. To assign such numerical values that represent levels of importance, one or more techniques may be implemented. For example, values representing such levels may be assigned through user interactions. Numerical values may be assigned to individual vertices, groups of vertices that define feature regions, individual character features, or based on other levels of resolution. As illustrated in frame 204a (which contains the content of frame 202a), each eyebrow of the character may be individually selected (as respectively represented with dashed-boxes 206a and 206b) and assigned a weight that represents the importance of including these facial features in the input for producing the character model. Similarly, as represented in frame 204b (which contains that content of frame 202b), multiple facial features (e.g., both eyebrows) may be selected as a group (as represented by dashed-box 208) and assigned a common weight for determining model production input (e.g., input for a compression technique). Other selection combinations are also possible, for example, a group of selected features (as represented with dashed-box 210a) may be assigned one weight (representing level of importance for inclusion in a model) while a selected feature (represented with dashed-box 210b) may be assigned a different (or equivalent) weight. Weights may also be dynamically assigned and adjusted. For example, weight assignments may vary from animation frame to animation frame. As such, a facial feature may be assigned one weight for one frame (or multiple frames) and another weight may be assigned to the feature as represented in another frame (or another set of frames). Based upon the applied weights, vertices, regions of vertices, character features, etc. can be prioritized for use in producing one or more compressed animation models such as reduced shape models.

One or more techniques may be used for assigning weights through user interactions. For example, identification and weight assignments may be applied through user interactions with a graphical software package. For example, painting, outlining or other types of graphical tools (e.g., provided by a computer aided design (CAD) package or similar software application) may be used to highlight character features. As illustrated, a dashed-line box may be opened over one or more features to initiate selection. Once identified, the user may provide input for prioritizing the feature with other features. For example, numerical values may be provided by a user through an input device (e.g., keyboard, drop down menu, etc,) for assigning a weight value to each selected feature. Identification and priority assignments may also be provided in an automated manner. For example, one or more processes may be executed (e.g., by computer system 104) for identifying vertices, regions of vertices, character features, etc. based upon one or more predefined rules. Criteria used by such processes may be associated with the movement of vertices (e.g., priority based upon movement thresholds), frequency of vertices movement (or other statistic of vertices movement), movement of neighboring vertices (e.g., priority based upon correlated movements) and other similar events. Identification and priority assignments may also be provided on multiple scales. For example, along with assigning some weights on a vertex-by-vertex basis (e.g., a user selects each vertex to be assigned a priority weight), other weights may be assigned to a region of vertices or at a feature level (e.g., all vertices associated with an eyebrow of a character).

In general, identifying (e.g., vertices) and applying weights is performed prior to compression (e.g., PCA compression). As such, frames of animation content with weighted vertices are provided as input to a compression process. In the illustrated example, facial features are selected from animation frames and corresponding vertices (associated with the selected features) are weighted for being used to produce a reduced shape model. Along with identifying and prioritizing input for a compression process, additional information may be used for producing realistic facial expressions and appropriate transitions between the expressions. For example, temporal information associated with transitioning between facial expressions may be utilized to enhance compression techniques such as PCA.

Figure 3:
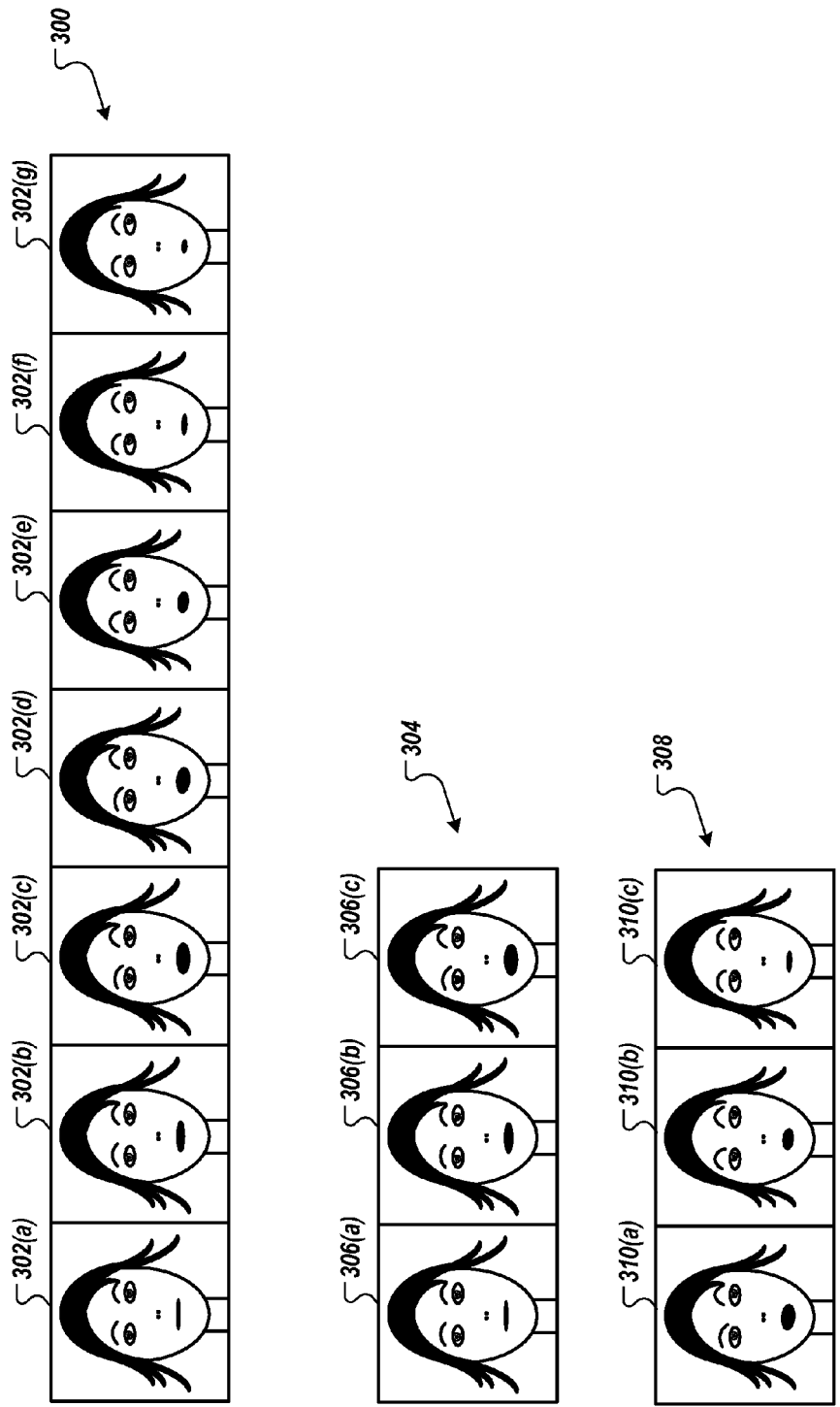
FIG. 3 illustrates animation temporal information used in animation model production.

Referring to FIG. 3, information associated with transitions between facial expressions may also be utilized for producing a compressed animation model with a reduced number of shapes. By representing such information within the compression technique, reconstructed frames may not only provide accurate character facial expressions but transitions between facial expressions may also be accurately portrayed. As such, transitions between reconstructed facial expressions may not appear to occur too fast or too slow.

One or more methodologies may be used for representing such temporal information in compression techniques such as PCA. For example, along with accounting for the movement of individual vertices (e.g., from one frame to the next), the velocity of the vertex movement may be used by the compression technique. Other information associated with vertex movement may also be represented in variant compression techniques, for example, the acceleration of vertices. Distributions, higher order statistics, etc. may also be used to characterize temporal information in compression schemes.

In one example, an error function is included in a variant of a compression scheme such as PCA that introduces coherence into the movement of vertices (e.g., from frame to frame). In one PCA variant, an error function is adjusted to account for relationships between adjacent animation frames. For example, a modified error function may be represented as:

$$\text{Error}(D, u) = \|D - uu^T D\|_F^2 + \alpha \sum_{j=2}^{m-1} (u^T(d_{j+1} - 2d_j + d_{j-1}))^2 \quad (1)$$

In which the term:

$$\sum_{j=2}^{m-1} (u^T(d_{j+1} - 2d_j + d_{j-1}))^2 \quad (2)$$

represents a smoothness penalty term and the terms $d_{j+1}$, $d_j$ and $d_{j-1}$ represent three adjacently positioned animation frames. As such, the velocity of vertices along with position changes are taken into account in the error function. While three adjacent frames are used for each error function iteration, more than three frames may be used in other arrangements. In another example, to substantially preserve the frequency content of the animation content, a penalty term is computed in the original space and the error function may be represented as:

$$\text{Error}_{smooth2}(D, u) = \qquad (3)$$
$$\|D - uu^T D\|_F^2 + \alpha \sum_{j=2}^{m-1} \|(I - uu^T)(d_{j+1} - 2d_j + d_{j-1})\|_2^2$$

in which the scalar quantity a applies a weighting function to both terms of the error function (e.g., an original least-squares error and the smoothness term). Values for the scalar quantity may be determined from analysis techniques (e.g., cross-validation/bootstrapping analysis), from empirical data, etc. Similar to equation (2), the penalty term uses three sample frames $d_{j+1}$, $d_j$ and $d_{j-1}$ for each iteration. Through the use of iterative techniques, the error functions may be minimized.

By adjusting the compression scheme to include such temporal information (e.g., from adjacent frames), reconstructed frames produced from the compressed animation model may closely match the original animation frames. Along with including such temporal information, the input content provided to the compression scheme may also assist with producing reconstructed frames that closely match the original frames, particularly frames considered important to an end viewer. For example, animation frames may be identified for input that represent facial expressions of particular interest (e.g., key frames) to a viewer. In one arrangement, such identified frames may present signature facial expressions of a character (e.g., a smile, squint, etc.) and be included in an compressed animation model so the signature expression or expressions can be reconstructed from the compressed animation model (and closely match the original expressions).

As illustrated, a sequence of animation frames 300 (e.g., that includes individual frames 302a-302g) represent a series of facial expressions that transition from a character's mouth being opened (e.g., frames 320a-302d) and back to a closed mouth (e.g., frames 302e-302g). While sequences of a few hundred frames (e.g., two hundred frames) are typically used for producing a compressed animation model, the sequence 300 includes seven frames for demonstrative purposes. By applying weights to the content of the frames (e.g., through user interaction) and using a compression technique that accounts for the velocity of vertices, a compressed animation model may be produced that is capable of reconstructing frames that closely match the input frame sequence 300. Based upon the additional input information (e.g., assigned weights) and adjusted compression processing (e.g., to account for temporal information), content of reconstructed frames may be more visually accurate. For example, weights may be applied to vertices represented in the frame sequence 304 (e.g., that includes frames 306a, 306b, 306c) for producing a reduced shape model that is capable of reconstructing frames (e.g., frames 306a-c). Similarly, the content of a shortened frame sequence 308, which illustrates the character's mouth being closed over a series of frames 310a, 310b, 310c (that correspond to frames 302d-f), may be weighted and provided to a compression scheme (e.g., adjusted to account for temporal information) to produce a reduced shape model. Along with reconstructing the content of frames 310a-c, one or more of which could contain a facial expression of interest, other facial expressions may be produced by the model. As such, splitting a frame sequence (e.g., sequence 300) into multiple shorter sequences (e.g., sequence 304 and 308) may not significantly alter the accuracy of content provided by reconstructed frames. However, splitting a frame sequence into multiple sequences (that contain a shortened number of frames) and producing a shape model for each frame segment may call for additional memory for storage. Considering the illustrated example, a reduced shape model could be produced for each of the two shortened frame sequences 304 and 308. As such two shape model are produced (e.g., each having sixteen shapes) that could call for twice the memory space compared to a single model (e.g., also including sixteen shapes) produced from the full sequence 300.

Figure 4:
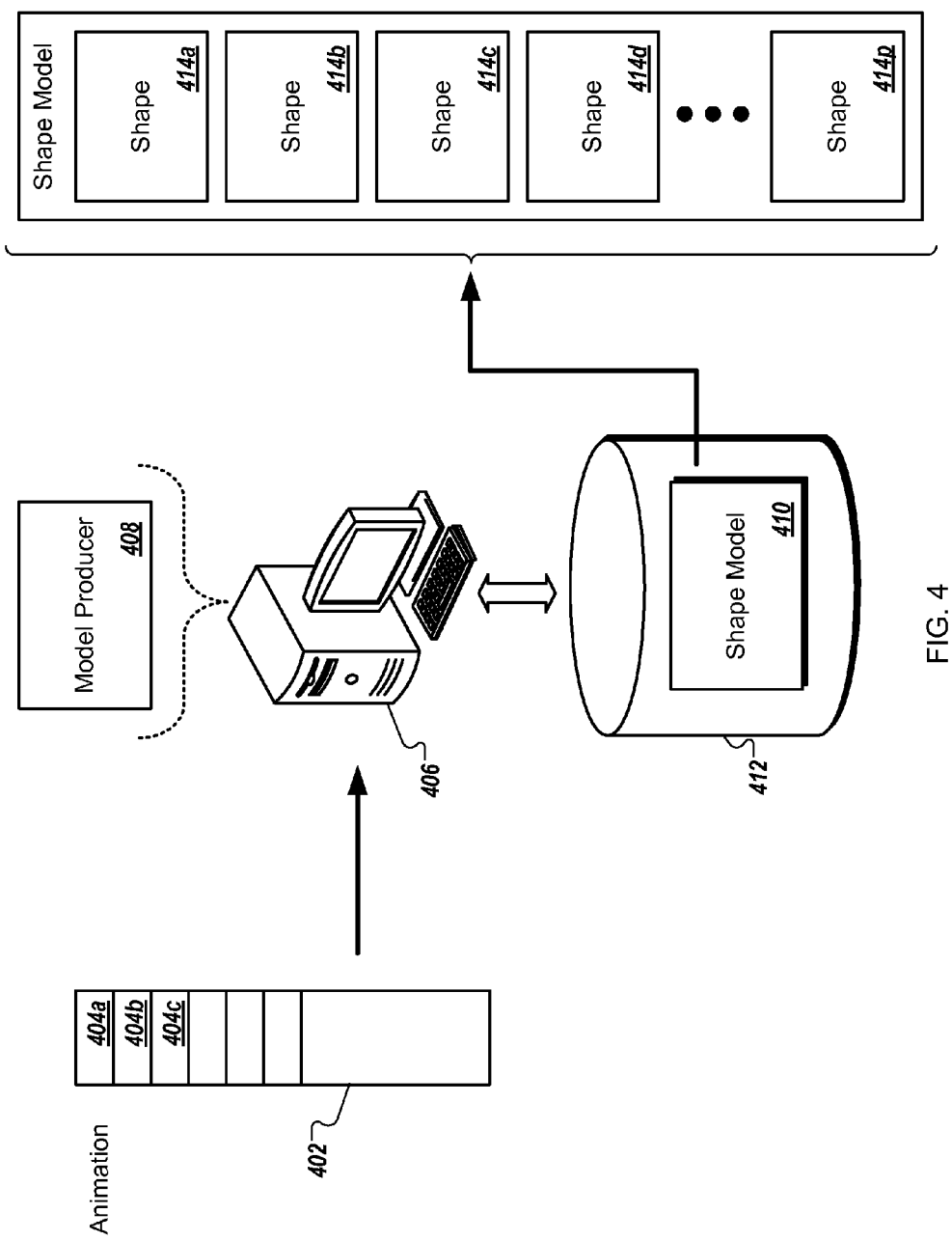
FIG. 4 illustrates processing an animation into an animation model.

Referring to FIG. 4, operations are illustrated for preparing one or more animations for compression to produce a compressed animation model. In this example, an animation 402 (e.g., a series of animation frames 404a, 404b, 404c, etc.) is provided to a computer system 404 for compression preparation and for being compressed. To provide such functionality, a model producer 408 is executed by the computer system 406 to produce, for example, a shape model 410 (e.g., a reduced shape character model) that is stored on a storage unit 412 (e.g., hard-drive, CD-ROM, etc.) in communication with the computer system 406. The shape model 410 can include a set of shapes (e.g., PCA vectors) or other types of objects. For example, the model 410 may include a reduced set of shapes. As illustrated in the figure, in this example, the shape model 410 includes a set of 16 shapes (e.g., shapes 414a, b, c, d, etc., and a shape 414p), however, in some implementations, more or less shapes may be included. In the present example, shapes included in the shape model 410 can be used to approximate the content included in the animation 402 (e.g., facial expressions). In general, the size of the shape model 410 can be less than the size of the animation 402, however, in some arrangements the size may be larger or equivalent.

Along with providing compression capabilities, in this arrangement the model producer 408 is capable of receiving and using levels of importance assigned to content (e.g., vertices) of the animation. For example, the model producer 408 may operate in concert with a graphical software package that assigns weights (through user interactions) to particular portions (e.g., vertices associated with a facial expression, regions of facial expression, etc.) of the content represented in the animation 402. In this arrangement, the processing provided by the model producer 408 also uses temporal information to produce the shape model 410. For example, processing provided by the model producer 408 may iteratively use movement and velocity information of vertices as provided by adjacent animation frames. By using weighted portions of the animation content and being adjusted to use temporal information, the shape model 410 provided by the model producer 402 may reconstruct animation frames that contain minimal differences compared to the original animation frames 402. Along with executing such operations, the model producer 408 may be capable of additional operations. For example, updating operations may be provided by the model producer 408 for incorporating additional animation content into a shape model. By introducing additional frames, previously produced shapes may be refined (or additional shapes produced) to account for the additional content. Updating may also include filtering or blocking information, for example, a predefined amount of animation may be needed to initiate an update. As such, information from a lesser amount of animation may be discounted until the proper amount is provided. By allowing such updates, the shape model 410 may be further refined and capable of representing broader scope of character features (e.g., facial expressions).

Figure 5:
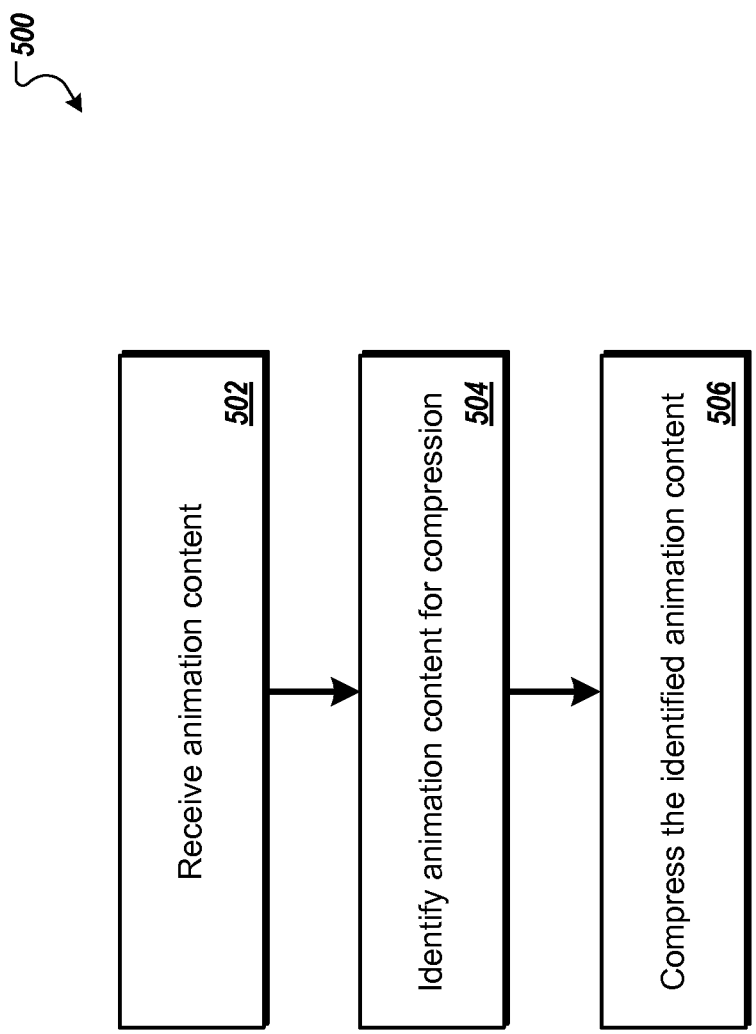
FIG. 5 is a flowchart that represents operations of a model producer.

Referring to FIG. 5, a flowchart 500 represents some of the operations of the model producer 408. The operations may be executed by a single computer system (e.g., the computer system 406) or multiple computing devices. Along with being executed at a single site (e.g., at one computer system), operation execution may be distributed among two or more sites.

Operations include receiving 502 animation content (e.g., frames of animation, etc.) to be compressed to produce a compressed animation model (e.g., a reduced shape model). In some arrangements, the animation content may be processed prior to compression. For example the content may be adjusted (e.g., filtered), frames may be removed or added, etc. Operations may also include identifying 504 portions of the animation content for inclusion in the compressed animation model. For example, through user interactions (e.g., with a graphical software package) vertices or regions associated with features of a character (represented in the content) may be selected for weight assignments (e.g., to indicate importance). Similarly, entire animation frames or sequence of animation frames may be identified (e.g., through user interaction or in an automatic manner with predefined rules) for inclusion in the compressed animation model. Once identified (e.g., weights assigned), the animation content may be further processed prior to compression, e.g., some operations may be executed to assist the compression scheme. For example, content may be grouped based upon assigned weights prior to compression. Once identified, operations may include compressing 506 the identified animation content to produce a compressed animation model. For example, compression techniques such as PCA and variants of PCA (adjusted to include temporal information associated with the animation content) may be implemented to produce an animation model with a reduced number of shapes. Additional operations may also be provided by the model producer 408. For example, the model producer 408 may reconstruct animation content from the produced model and compare the reconstructed content (e.g., reconstructed animation frames) to the originally received animation content. Based upon the comparison, adjustments may be made to the identified content (e.g., adjust the weight assignments, include additional content, etc.) and possibly the compression scheme (e.g., to account for additional temporal information) such that the reconstructed content more closely matches the original animation content.

To perform the operations described in flow chart 500, the model producer 408 may perform any of the computer-implemented methods described previously, according to one implementation. For example, a computer system such as computer system 406 (shown in FIG. 4) may execute the model producer 408. The computer system 406 may include a processor (not shown), a memory (not shown), a storage device (e.g., storage device 412), and an input/output device (not shown). Each of the components may be interconnected using a system bus or other similar structure. The processor is capable of processing instructions for execution within the computer system. In one implementation, the processor is a single-threaded processor, however, one or more multi-threaded processors may be used in other implementations.

Figure 6:
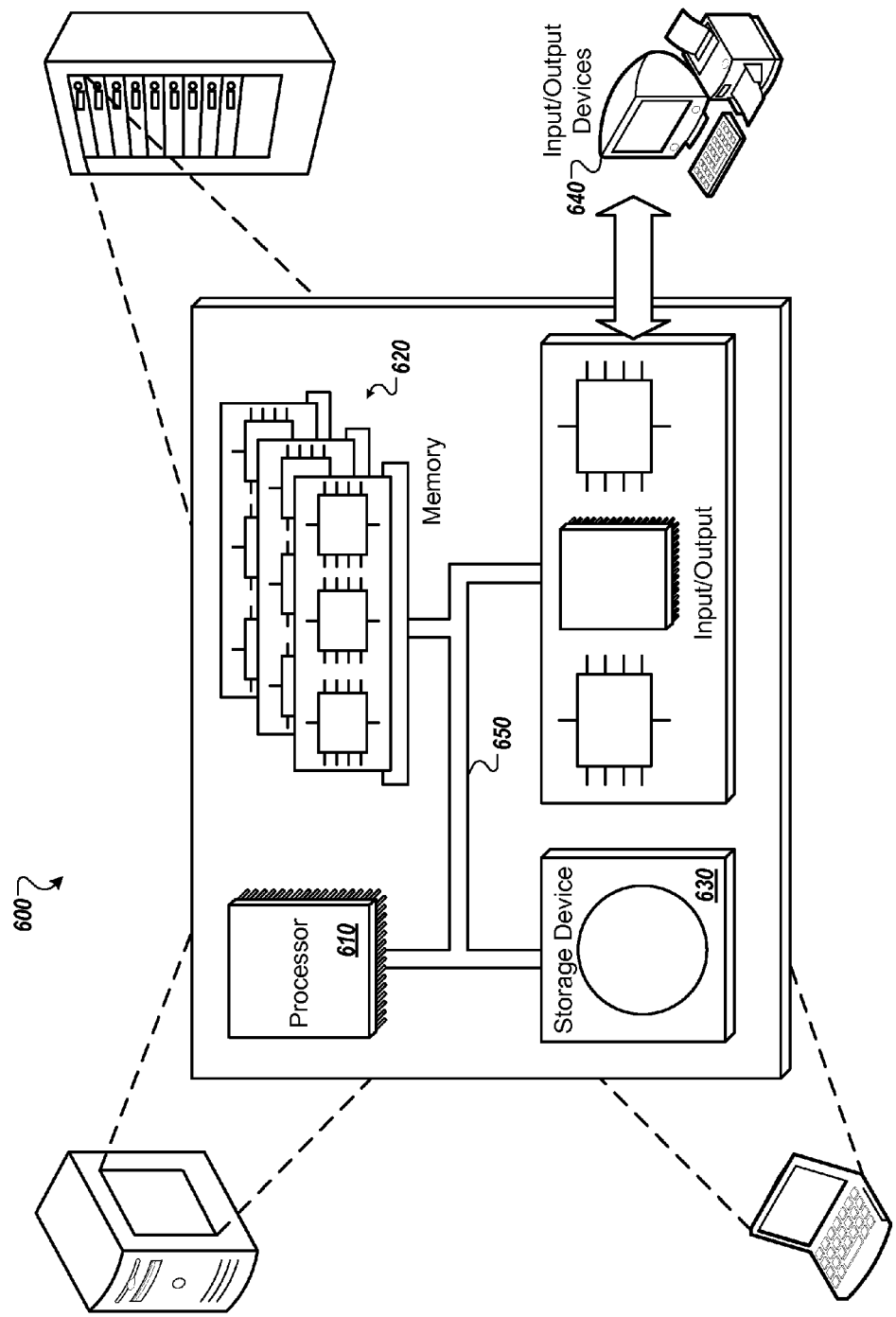
FIG. 6 represents a computer system and related components.

FIG. 6 is a schematic diagram of a generic computer system 600. The system 600 can be used for the operations described in association with any of the computer-implemented methods described previously, according to one implementation. The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In some implementations, the memory 620 is a computer-readable medium. The memory 620 is a volatile memory unit in some implementations and is a non-volatile memory unit in other implementations.

The storage device 630 is capable of providing mass storage for the system 600. In one implementation, the storage device 630 is a computer-readable medium. In various different implementations, the storage device 630 may be a floppy disk device, a hard disk device, an optical disk device, or a tape device.

The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the following claims.

What is claimed is:

1. A computer-implemented method comprising:
   receiving an animation including a series of frames;
   identifying a portion of a representation of a character in a frame of the animation, wherein the identified portion is associated with a feature of the character to be represented in a reconstructed version of the animation;
   assigning a weight to the identified portion to produce a prioritized input usable for compressing the animation, the weight being assigned prior to compression of the animation and representing a priority of the portion to be included in a compressed model, wherein the weight is assigned to one or more vertices corresponding to the feature of the character to produce the prioritized input including one or more weighted vertices; and
   compressing the animation using the one or more weighted vertices to produce the compressed model, the compressed model being usable for reconstructing the animation, wherein whether the compressed model includes the identified portion is based on the weight assigned to the portion.

2. The computer-implemented method of claim 1, wherein assigning the weight to the identified portion of the character is based upon a rule.

3. The computer-implemented method of claim 1, wherein assigning the weight to the identified portion of the character is based upon user input.

4. The computer-implemented method of claim 1, wherein the identified portion of the character includes a surface region of the character.

5. The computer-implemented method of claim 1, wherein assigning the weight to the identified portion of the character is based upon a facial expression of the character in the animation.

6. The computer-implemented method of claim 1, wherein the compressed model includes a set of shapes corresponding to features of the character, the set of shapes representing information relating to one or more position changes of the identified portion across the series of frames included in the animation.

7. The computer-implemented method of claim 1, wherein the compressed model includes a set of shapes corresponding to features of the character, the set of shapes representing information relating to a movement of a vertex represented in the series of frames included in the animation.

8. The computer-implemented method of claim 1, wherein the compressed model includes a set of shapes corresponding to features of the character, the set of shapes representing information relating to a velocity of a vertex represented in the series of frames included in the animation.

9. The computer-implemented method of claim 1, wherein the character feature is included in a facial expression of the character.

10. The computer-implemented method of claim 1, wherein the compressing includes principal component analysis.

11. The computer-implemented method of claim 1, wherein the model includes sixteen shapes.

12. The computer-implemented method of claim 1, wherein the character is an online character included in a video game.

13. A non-transitory computer program product tangibly embodied in an information carrier and comprising instructions that when executed by a processor perform a method comprising
   receiving an animation including a series of frames;
   identifying a portion of a representation of a character in a frame of the animation, wherein the identified portion is associated with a feature of the character to be represented in a reconstructed version of the animation;
   assigning a weight to the identified portion to produce a prioritized input usable for compressing the animation, the weight being assigned prior to compression of the animation and representing a priority of the portion to be included in a compressed model, wherein the weight is assigned to one or more vertices corresponding to the feature of the character to produce the prioritized input including one or more weighted vertices; and
   compressing the animation using the one or more weighted vertices to produce the compressed model, the compressed model being usable for reconstructing the animation, wherein whether the compressed model includes the identified portion is based on the weight assigned to the portion.

14. A non-transitory computer program product of claim 13, wherein assigning the weight to the identified portion of the character is based upon a rule.

15. A non-transitory computer program product of claim 13, wherein assigning the weight to the identified portion of the character is based upon user input.

16. A non-transitory computer program product of claim 13, wherein the identified portion of the character includes a surface region of the character.

17. A non-transitory computer program product of claim 13, wherein assigning the weight to the identified portion of the character is based upon a facial expression of the character in the animation.

18. A non-transitory computer program product of claim 13, wherein the compressed model includes a set of shapes corresponding to features of the character, the set of shapes representing information relating to one or more position changes of the identified portion across the series of frames included in the animation.

19. A non-transitory computer program product of claim 13, wherein the compressed model includes a set of shapes corresponding to features of the character, the set of shapes representing information relating to a movement of a vertex represented in the series of frames included in the animation.

20. A non-transitory computer program product of claim 13, wherein the compressed model includes a set of shapes corresponding to features of the character, the set of shapes representing information relating to a velocity of a vertex represented in the series of frames included in the animation.

21. A non-transitory computer program product of claim 13, wherein the character feature is included in a facial expression of the character.

22. A non-transitory computer program product of claim 13, wherein the compressing includes principal component analysis.

23. A non-transitory computer program product of claim 13, wherein the model includes sixteen shapes.

24. A non-transitory computer program product of claim 13, wherein the character is an online character included in a video game.

25. A system comprising:
a computing device comprising:
  a memory configured to store instructions; and
  a processor configured to execute the instructions to perform a method comprising:
    receive an animation including a series of frames;
    identify a portion of a representation of a character in a frame of the animation, wherein the identified portion is associated with a feature of the character to be represented in a reconstructed version of the animation;
    assign a weight to the identified portion to produce a prioritized input usable for compressing the animation, the weight being assigned prior to compression of the animation and representing a priority of the portion to be included in a compressed model, wherein the weight is assigned to one or more vertices corresponding to the feature of the character to produce the prioritized input including one or more weighted vertices; and
    compress the animation using the one or more weighted vertices to produce the compressed model, the compressed model being that is usable for reconstructing the animation, wherein whether the compressed model includes the identified portion is based on the weight assigned to the portion.

26. The system of claim 25, wherein assigning the weight to the identified portion of the character is based upon a rule.

27. The system of claim 25, wherein assigning the weight to the identified portion of the character is based upon user input.

28. The system of claim 25, wherein the identified portion of the character includes a surface region of the character.

29. The system of claim 25, wherein assigning the weight to the identified portion of the character is based upon a facial expression of the character in the animation.

30. The system of claim 25, wherein the compressed model includes a set of shapes corresponding to features of the character, the set of shapes representing information relating to one or more position changes of the identified portion across a series of frames included in the animation.

31. The system of claim 25, wherein the compressed model includes a set of shapes corresponding to features of the character, the set of shapes representing information relating to a movement of a vertex represented in the series of frames included in the animation.

32. The system of claim 25, wherein the compressed model includes a set of shapes corresponding to features of the character, the set of shapes representing information relating to a velocity of a vertex represented in the series of frames included in the animation.

33. The system of claim 25, wherein the character feature is included in a facial expression of the character.

34. The system of claim 25, wherein the compressing includes principal component analysis.

35. The system of claim 25, wherein the model includes sixteen shapes.

36. The system of claim 25, wherein the character is an online character included in a video game.

* * * * *

UNITED STATES PATENT AND TRADEMARK OFFICE
CERTIFICATE OF CORRECTION

PATENT NO. : 8,786,610 B1
APPLICATION NO. : 12/793273
DATED : July 22, 2014
INVENTOR(S) : Frederic P. Pighin and Jerome Scholler Page 1 of 1

It is certified that error appears in the above-identified patent and that said Letters Patent is hereby corrected as shown below:

In the Claims:

At column 14, Claim 25, line 3

Following the phrase "the compressed model being" please delete "that is".

Signed and Sealed this
Eighteenth Day of November, 2014

Michelle K. Lee
*Deputy Director of the United States Patent and Trademark Office*